United States Patent [19]

Ragazzini

[11] 4,253,365
[45] Mar. 3, 1981

[54] HACK SAWING MACHINE

[76] Inventor: Mario Ragazzini, Via Montanara, 26/A, Fontanelice, (Bologna), Italy

[21] Appl. No.: 64,284

[22] Filed: Aug. 6, 1979

[51] Int. Cl.³ .............................................. B23D 51/20
[52] U.S. Cl. ........................................ 83/755; 83/759; 83/756; 83/647; 83/757; 83/773; 30/392
[58] Field of Search ................. 83/753, 754, 755, 756, 83/757, 759, 647, 772, 773; 30/392

[56] References Cited

U.S. PATENT DOCUMENTS

| 4,015,500 | 4/1977 | Stolzer | 83/755 |
| 4,020,555 | 5/1977 | Hedrick | 30/392 |

FOREIGN PATENT DOCUMENTS 789764  1/1958  United Kingdom ...................... 30/392

*Primary Examiner*—Donald R. Schran
*Attorney, Agent, or Firm*—Guido Modiano; Albert Josif

[57] ABSTRACT

A hack sawing machine is disclosed, which comprises a base, a case, a shaft rotated by a motor, a saw blade bow guided in a sliding movement in the case, a drum cam which causes the blade to have an active forward stroke and a passive return stroke, a two-armed lever (bracket), eleastic means which, rotating the case, bring the blade back into the cut after the passive stroke and a hydraulic system. This system comprises a hydraulic cylinder, a hydraulic circuit having a hydraulic pump to pump oil to the cylinder. The hydraulic circuit acts to maintain a predetermined pressure of the saw blade bow on the workpiece during the active stroke and camming means cause the bow to be raised during the passive stroke.

4 Claims, 3 Drawing Figures

HACK SAWING MACHINE

BACKGROUND OF THE INVENTION

This invention relates to a hack sawing machine, particularly for cross cutting cylindrical metal stock.

Known are currently several types of hack sawing machines for cutting metal stock. Such sawing machines comprise in general a base or stand, which is provided with means for clamping the material to be cut thereon, to said base or stand there being hinged a saw blade bow which is reciprocated by an electric motor through a connecting rod drive. At its cutting stroke limit, the saw blade is automatically raised and caused to complete its return stroke. The pressure of the blade on the material being cut comes generally from the weight of the saw bow itself.

Such known types of hack sawing machines generally operate at low speeds, due to the time lost to the passive return stroke of the saw bow. Moreover, owing to the connecting rod drive system, the saw blade speed varies sinusoidally, thus producing an uneven cutting action.

Another drawback, frequently encountered with such conventional hack sawing machines is that it is impossible to adjust the cutting pressure in accordance with the material to be sawn.

SUMMARY OF THE INVENTION

This invention sets out to eliminate the cited drawbacks of conventional hack sawing machines by providing a sawing machine which affords a reduction of the machine dead times, a constant speed cutting stroke, and adjustment of the blade penetration force in accordance with the material to be cut.

According to one aspect of the present invention, there is provided a hack sawing machine characterized in that it comprises a base, a vice for clamping a workpiece being mounted to said base, a case hinged to said base, a shaft carried rotatably inside said case and rotatively driven by a motor mounted to said case, a blade carrying bow slidably guided in said case in a direction parallel to said shaft, a drum cam rotatively rigid with said shaft for reciprocating said blade carrying bow back and forth through an active forward stroke and a passive return stroke, a two-arm lever journalled in said case along an axis perpendicular to said shaft, elastic means interposed between one arm of said lever and said case, a hydraulic cylinder articulated with one end to said base and with the other end to the arm of said lever opposing said one arm whereon said elastic means are active, a hydraulic circuit supplying said cylinder such as to maintain said blade carrying bow on the workpiece with a predetermined pressure during the active stroke, and camming means mounted to said shaft and acting on said lever to cause said case to be rotated and said blade carrying bow to be raised during the passive stroke.

BRIEF DESCRIPTION OF THE DRAWINGS

Further features of the invention will be more clearly apparent from the following description of the hack sawing machine, illustrated in the accompanying drawings, where.

DESCRIPTION OF THE PREFERRED EMBODIMENTS

Figure 1:
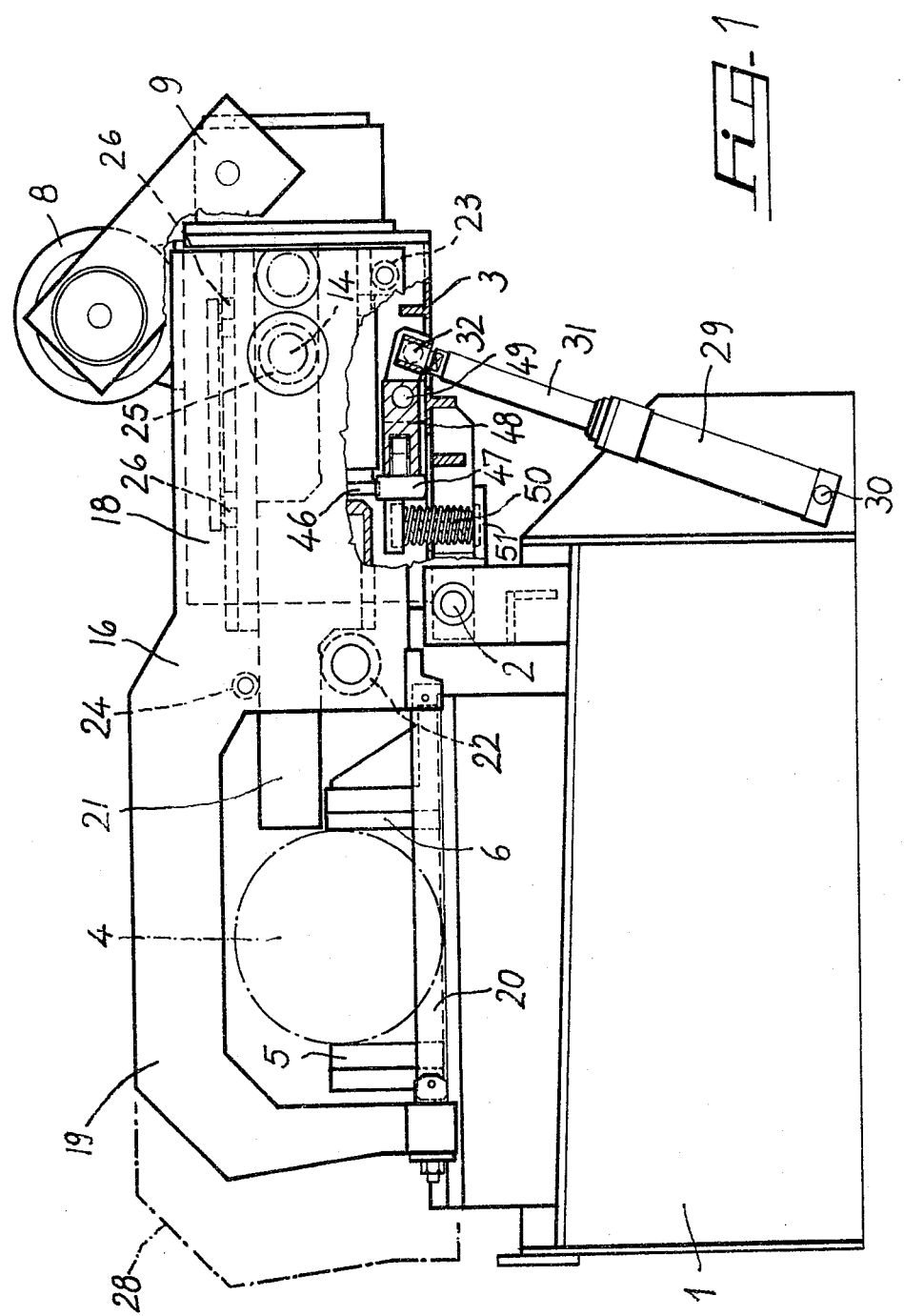
FIG. 1 is a partly sectional side view of this hack sawing machine.
Figure 2:
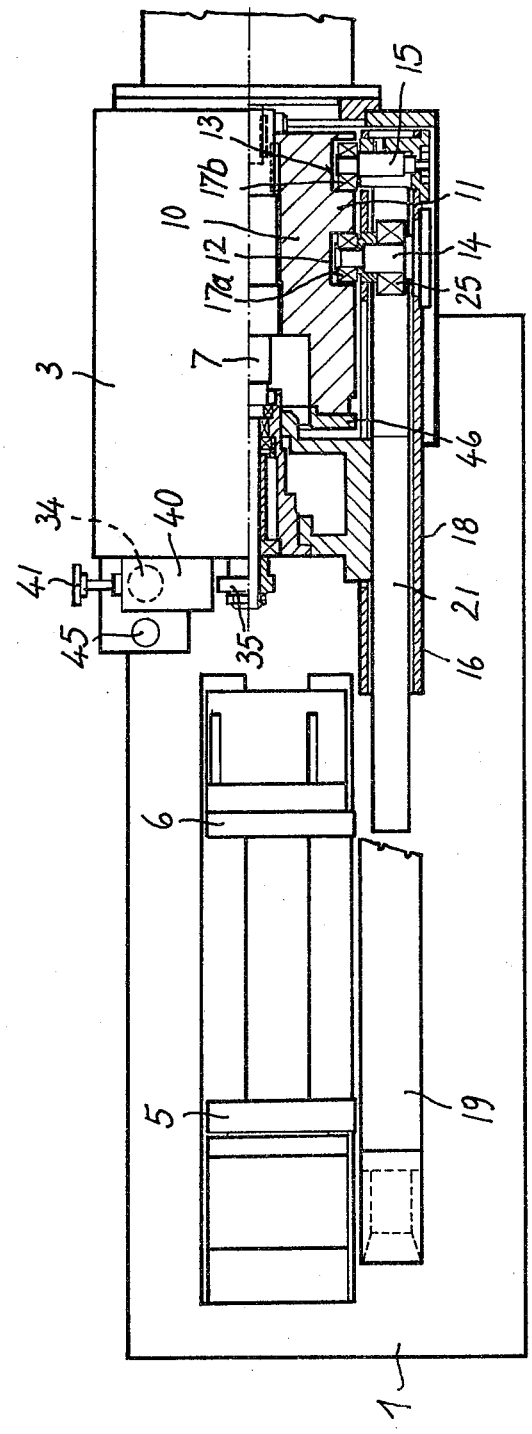
FIG. 2 is a partly sectional top view of the hack sawing machine.
Figure 3:
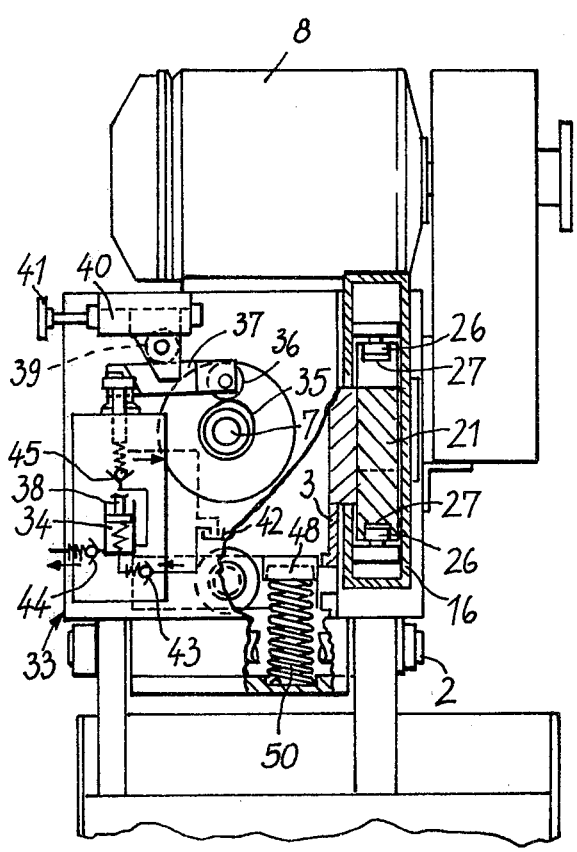
FIG. 3 is a fragmentary cross-sectional view of the hack sawing machine, taken at the hydraulic control circuit.

With reference to FIGS. 1, 2 and 3, the hack sawing machine according to this invention comprises a base 1, which carries a top mounted pivot pin 2, whereto a case 3 is hinged. On the base 1, there is laid crosswise the metal material workpiece 4 to be cut, which is clamped between jaws 5, 6 of a vice not shown in detail. Inside the case 3, there is located a shaft 7 having its axis parallel to the sawing machine longitudinal axis, said shaft 7 is rotatively driven by an electric motor 8 through a drive 9, also mounted to the case 3.

There is mounted on the shaft 7 a drum cam 10, the rolling surface whereof is formed with a collar 11, which is defined between a first groove 12 and a second groove 13, both formed in the drum cam 10 in closed loop configurations. The collar 11 has a rectangular cross-section and an oblique lay with respect to the axis of the cam.

With the first groove 12 and second groove 13, there are engaged cam followers which comprise respectively a first shaft 14 and second shaft 15, both shafts having their axis horizontal and perpendicular to the axis of the drum cam 10, rigidly mounted to the end of a blade carrying bow or saw blade bow 16. The contact between the circular grooves 12 and 13, and the shafts 14 and 15, occurs with the intermediary of roller bearings 17a and 17b, having a slightly crowned outer surface for producing a punctiform contact with the parallel surfaces of the worm and avoiding slipping phenomena.

The blade carrying bow 16 comprises substantially a box-like portion 18, wherein there are accommodated the members whereby it receives the cutting movement, and a bow-shaped portion 19 between the ends whereof is secured the saw blade 20.

The saw blade bow 16 rests on a guide 21, extending substantially longitudinally in the direction of motion of the saw blade bow 16 itself, the resting arrangement including downwardly a first roller 22 and second roller 23, which are mounted to the box-like portion 18 of the saw blade bow 16 and engage the ends of the guide 21, and upwardly a third roller 24 and fourth roller 25, the latter being mounted to the first shaft 14, which are also in engagement with the two ends of the guide 21.

The saw blade bow 16 is further guided in its cutting movement by means of several rollers 26 which run in a pair of grooves 27 formed in the upper face and lower face of the guide 21.

The saw blade bow 16 performs, due to the action of the drum cam 10, an active or working forward stroke, during which material is removed, up to a position 28 shown by a dash-and-dot line in FIG. 1, and a passive return stroke, during which the blade is raised off the workpiece 4. The drum cam 10 is shaped such that the forward stroke covers an angle of 240° with constant increment, and the return stroke covers a 120° angle, thus generating a differentiated speed reciprocation of the saw blade bow 16.

To the base 1 is hinged a hydraulic cylinder 29 through a pin 30. The rod 31 sliding inside such a hydraulic cylinder 29 is in turn hinged at its top end to a lever 48 having two arms as explained hereinafter.

The hydraulic cylinder 29 is actuated by a hydraulic control circuit 33, shown particularly in FIG. 3. Said hydraulic control circuit 33, contained inside the case 3, comprises a hydraulic pump 34 driven through a second cam 35 keyed to the shaft 7.

The second cam 35 acts on an idle wheel 36 mounted to one end of a lever 37 acting at the other end on a small piston 38 of the hydraulic pump 34. The pivot point of said lever 37 is represented by a second wheel 39 resting on the top of said lever 37 in a substantially central position which can be shifted through a screw mechanism 40 controlled by means of a handwheel 41.

The hydraulic pump 34 receives oil from a reservoir 42 through a suction valve 43 and pumps it to the lower portion of the hydralic cylinder 29 through a delivery valve 44.

A pressure relief valve 45 is operative to return oil from the interior of the pump 34 to the reservoir 42. To the shaft 10, a third cam 46 is also keyed which engages a roller 47 mounted at a substantially central position of a bracket 48. This bracket is essentially a two-armed lever which is pivoted centrally to the case 3 by means of a third pivot pin 49. To one arm of the lever 48, there is articulated the rod 31 of the hydraulic cylinder 29 through the second pivot pin 32. The other arm of the lever 48 rests on a bracket 51, downwardly rigid with the case 3 through a pair of springs 50.

The machine of this invention operates as follows.

The cam 10, which is rotated by the motor 8, generates the reciprocating motion for the saw blade bow 16 which slides on the guide 21 under control of the drum cam 10. The configuration of the collar 11 produces a constant increment 240° advance or forward movement, and a return movement through an arc of 120°, i.e. at a speed twice that of the forward movement.

Immersion or penetration of the blade during the forward stroke is obtained by means of the hydraulic cylinder 29 which is actuated by the hydraulic control circuit 33. The second cam 35, in synchronization with the drum cam 10, as being keyed to the same shaft 7, acts on the piston 38 of the hydraulic pump 34, through the lever 37, to admit oil into the hydraulic cylinder 29.

The raising of the rod 31 of the hydraulic cylinder 29 causes the saw blade bow 16 and case 3 to rotate about the pivot pin 2 against the piece 4.

The amount of oil pumped by the hydraulic pump 34 into the hydraulic cylinder 29, and consequently the penetration of the blade into the stock material, is adjustable by shifting the position of the pivot point of the lever 37 by means of the handwheel 41.

The operation of the hydraulic pump 34 is further regulated by the suction valve 43 and delivery valve 44. If, for a reason whatever, excess pressure is generated inside the hydraulic pump 34, the relief valve dumps part of the oil into the reservoir 42. Upon reaching the forward stroke limit, the blade 20 is raised from the cut to permit chips to be discharged during the return stroke. Such raising movement is effected by the third cam 46 which acts, in timed relationship with the other cams, on the roller 47, to rotate the bracket 48 about the second pivot pin 32, which pin is a fixed point because the cylinder is locked. Thus, the third pin 49 is lowered with respect to the pin 2 of the case 3, which is therefore caused to rotate and remove the blade 20 from the cut.

Upon completion of the return stroke, the cam ceases its operation and, under the bias of the springs 50, the bracket 48 produces a rotation of the case 3 in the opposite direction, thus bringing the blade 20 back into the cut.

I claim:

1. A hack sawing machine characterized in that it comprises a base, a vice for clamping a workpiece being mounted to said base, a case hinged to said base, a shaft carried rotatably inside said case and rotatively driven by a motor mounted to said case, a blade carrying bow slidably guided in said case in a direction parallel to said shaft, a drum cam rotatively rigid with said shaft for reciprocating said blade carrying bow back and forth through an active forward stroke and a passive return stroke, a two-arm lever journalled in said case along an axis perpendicular to said shaft, elastic means interposed between one arm of said lever and said case, a hydraulic cylinder articulated with one end to said base and with the other end to the arm of said lever opposing said one arm whereon said elastic means are active, a hydraulic circuit supplying said cylinder such as to maintain said blade carrying bow on the workpiece with a predetermined pressure during the active stroke, and camming means mounted to said shaft and acting on said lever to cause said case to be rotated and said blade carrying bow to be raised during the passive stroke.

2. A machine according to claim 1, characterized in that said hydraulic circuit comprises a piston-type hydraulic pump driven through a cam keyed to said shaft with the intermediary of lever means.

3. A machine according to claim 2, characterized in that said lever means comprise a lever pivoted rocker arm-fashion on an adjustable pivot pin and having one end bearing on said cam and the opposite end active on said piston.

4. A machine according to claim 1, characterized in that said drum cam comprises a pair of closed loop grooves defining a collar in engagement, at the opposing faces, with cam followers rigid with said blade carrying bow, said collar being configurated such that the active stroke covers an angle of 240° and the passive stroke covers an angle of 120°.

* * * * *